United States Patent
Rhodes

(10) Patent No.: US 12,554,988 B2
(45) Date of Patent: Feb. 17, 2026

(54) SYSTEM AND METHOD FOR COMPRESSING CONVOLUTIONAL NEURAL NETWORKS

(71) Applicant: Intel Corporation, Santa Clara, CA (US)

(72) Inventor: Anthony Daniel Rhodes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1149 days.

(21) Appl. No.: 17/511,713

(22) Filed: Oct. 27, 2021

(65) Prior Publication Data

US 2022/0051103 A1 Feb. 17, 2022

(51) Int. Cl.
*G06N 3/082* (2023.01)
*G06F 18/214* (2023.01)

(52) U.S. Cl.
CPC .......... *G06N 3/082* (2013.01); *G06F 18/214* (2023.01)

(58) Field of Classification Search
CPC ............... G06N 3/082; G06F 18/214
See application file for complete search history.

(56) References Cited

U.S. PATENT DOCUMENTS

| | | | |
|---|---|---|---|
| 2021/0049423 A1* | 2/2021 | Hu | G06F 18/214 |
| 2022/0101093 A1* | 3/2022 | Hildebrandt | G06N 3/042 |

FOREIGN PATENT DOCUMENTS

CN 106127297 A * 11/2016 ............... G06N 3/04

OTHER PUBLICATIONS

W. Sun, S. Chen, L. Huang, H. C. So and M. Xie, "Deep Convolutional Neural Network Compression via Coupled Tensor Decomposition," in IEEE Journal of Selected Topics in Signal Processing, vol. 15, No. 3, pp. 603-616, Apr. 2021, doi: 10.1109/JSTSP.2020. 3038227. (Year: 2020).*

Li, Tuanhui and Wu, Baoyuan and Yang, Yujiu and Fan, Yanbo and Zhang, Yong and Liu, Wei, "Compressing Convolutional Neural Networks via Factorized Convolutional Filters," in Proceedings of the IEEE/CVF Conference on Computer Vision and Pattern Recognition (CVP), Jun. 2019 (Year: 2019).*

(Continued)

*Primary Examiner* — Kevin L Young
*Assistant Examiner* — Meghan Anne Riehl
(74) *Attorney, Agent, or Firm* — Akona IP PC

(57) ABSTRACT

An apparatus is provided to compress CNN models using a combination of filter pruning and tensor decomposition. For example, the apparatus accesses a trained CNN that includes convolutional tensors. The apparatus prunes the filters of a convolutional tensor to generate a sparse tensor. Further, the apparatus decomposes the sparse tensor to generate a low-rank approximation of the sparce tensor. The low-rank approximation of the sparse tensor includes a core tensor and principal tensors. The apparatus generates a convolutional flow that includes the core tensor and convolutional operations generated based on the principal tensors. The apparatus may replace some or all the convolutional tensors in the trained CNN with the corresponding convolutional flows. The apparatus may fine-tune the updated CNN by re-training the updated CNN. The number of epochs for re-training the updated CNN may be smaller than the number of epochs for training the CNN.

25 Claims, 11 Drawing Sheets

(56) References Cited

OTHER PUBLICATIONS

"Compression of Deep Neural Networks by Combining Pruning and Low Rank Decomposition." Anonymous Author(s) Submitted to 32nd Conference on Neural Information Processing Systems (NIPS 2018) 5 Pages.
Frankle, Jonathan et al, "The Lottery Ticket Hypothesis: Finding Sparse, Trainable Neural Networks." arXiv: Learning (2019): pp. 1-42.
Kim, Yong-Deok et al "Compression of Deep Convolutional Neural Networks for Fast and Low Power Mobile Application", CoRR abs/1511.06530 (2016): pp. 1-16.

* cited by examiner

SYSTEM AND METHOD FOR COMPRESSING CONVOLUTIONAL NEURAL NETWORKS

TECHNICAL FIELD

This disclosure relates generally to neural networks, and more specifically, to compressing convolutional neural networks (CNNs).

BACKGROUND

Deep neural networks are now being used extensively for a variety of artificial intelligence applications ranging from computer vision to speech recognition and natural language processing. A CNN is a deep learning algorithm that can take in an input image, assign importance (learnable weights and biases) to various aspects/objects in the image, and differentiate one from the other. CNNs have become ubiquitous in object recognition, image classification, image retrieval, or other types of applications. However, many CNNs are too big to fit in systems having limited computing resources, e.g., limited memory or limited processing power.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
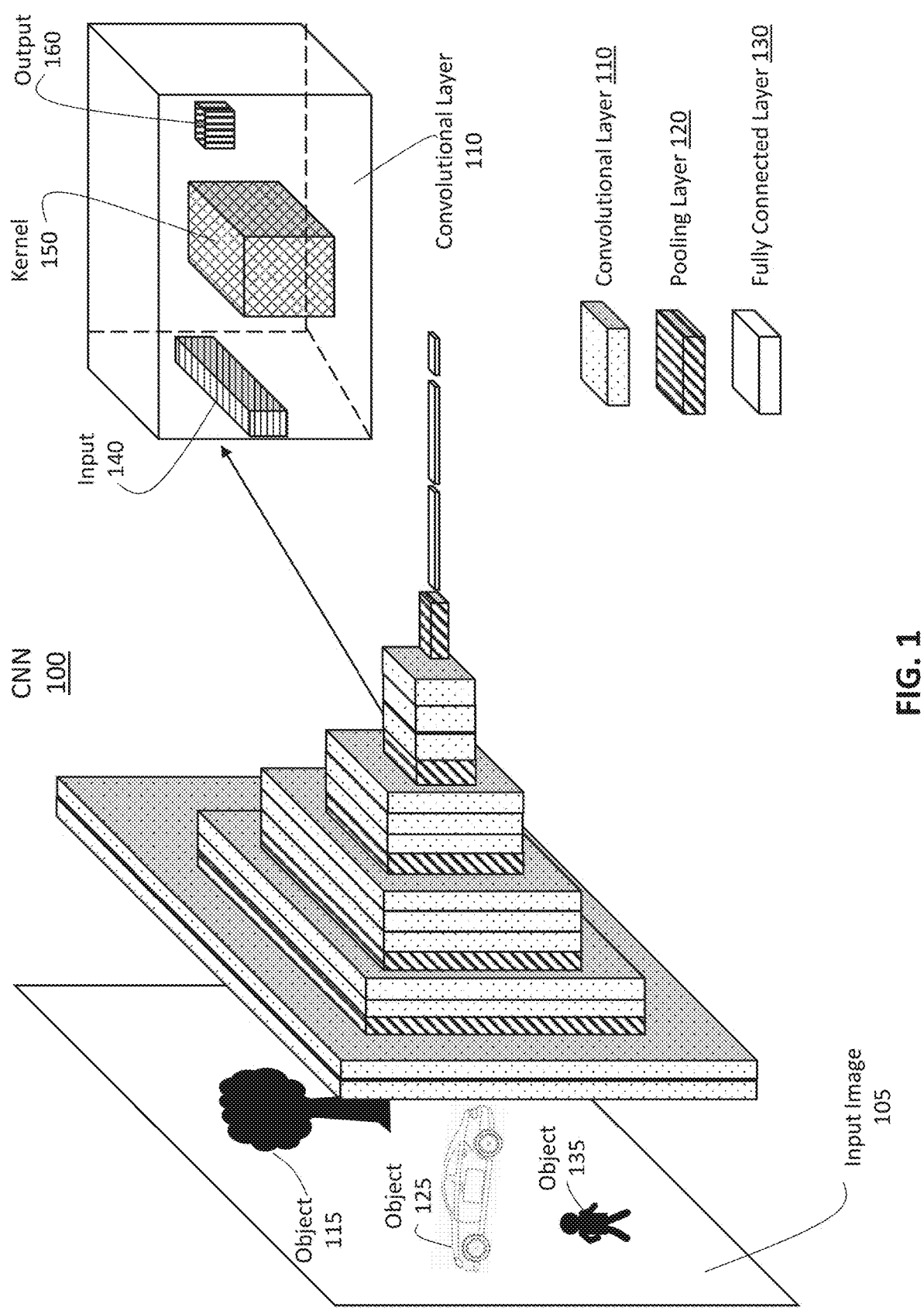
FIG. 1 illustrates an architecture of an example CNN, in accordance with various embodiments.

Deep learning (DL) models are characterized by the ability to produce effective abstract representations of data using automatic latent feature extraction. To accomplish this, deep neural networks are substantially more complex compared to more traditional machine learning techniques and require many orders of magnitude more parameters to be trained. One focus in the DL space is transforming CNNs from large unwieldy, overparameterized models into more sustainable network designs. This effort is catalyzed by several factors, including: the desire to conserve memory and compute overhead for the deployment of commercial DL models, energy sustainability, the need for greater model interpretability, and the aspiration to port DL models to low compute environments, including edge and IOT devices. For instance, as datasets increase in size, networks also increase in complexity, number of layers and parameters in order to absorb the supervision. The increased size of the networks makes it increasingly difficult for the model to be deployed in low memory environments such as, mobile phones, IOT edge devices, etc. Various technologies have been considered for reducing the size of networks with limited loss of accuracy in the prediction, so that the model can fit in the memory of low resource systems.

Approaches for compressing CNN models include pruning, quantization, low-rank and sparse approximations, and knowledge distillation. For example, in one class of approaches, pruning of the weights of a trained CNN or pruning at the level of feature maps and filters is done to reduce the model size. Pruning is a process of pruning weights which connect neurons from two adjacent layers in the network. Pruning filters from convolution layers is a standard method of compressing the CNNs. Pruning CNNs play a major role in image processing tasks like image classification, object detection, semantic segmentation. A common pruning approach is Lottery Ticket Pruning (LTP). The LTP algorithm trains and prunes a model over several full training iterations. In the first stage of the LTP algorithm, a DL model is trained to fruition, i.e., for the "full" number of epochs. The number of epochs is a hyperparameter that defines the number of times that the deep learning algorithm will work through the entire training dataset. One epoch means that each sample in the training dataset has had an opportunity to update parameters inside the CNN (e.g., weights of filters). Following this initial training round, a percentage of edges/filters are pruned from the model using so-called "iterative magnitude pruning" wherein the edges/filters of minimum (absolute) magnitude are pruned (typically each round between 10% and 20% of the edges/filters are pruned). In subsequent pruning rounds, this magnitude pruning step is repeated, and the new model is trained again to fruition—yielding an increasingly sparse model. The model performance of the pruned CNN can be improved by "re-training" the CNN following the pruning step, if the initial parameters of the model are reset to the values used for the initial model training (instead of resetting them with each subsequent re-train). The LTP approach can retain a high degree of model performance across a variety of standard DL models. However, the LTP approach has a significant drawback, as it requires many iterations of training a model from scratch, which can result in five times or even ten times increases in the total amount of compute required to generate the final model. The LTP approach can be very time consuming and require lots of computing resource.

Another approach for compressing CNNs is low-rank tensor decomposition. Low-rank tensor decomposition represents a higher order generalization of classical model compression and dimensionality reduction techniques, with Singular Value Decomposition (SVD) being the best-known exponent. SVD and related techniques transform a data matrix into the product of several low-rank matrices. The resultant low-rank decomposition provides a cheaper to compute/store approximation to the original data matrix. Tucker decomposition has been used as a low-rank factorization method for decomposing convolution and fully connected layers in CNN. It computes a Higher Order Singular Value Decomposition (HOSVD) of a n-D Tensor along each of its dimensions. However, such tensor decomposition approaches cannot reduce the size of CNNs to a satisfying level without losing required model accuracy. Therefore, improved technology for compressing CNNs is needed.

Embodiments of the present invention relate to a CNN compressing method that combines filter pruning and tensor decomposition. The CNN compressing method includes a first sparsification step that reduces the size of a pre-trained CNN through filter pruning. For instance, the method prunes filters of some or all the convolutional layers in the CNN. Convolutional layers are represented by convolutional tensors. Tensors are generalizations of matrices to higher dimensions and can consequently be treated as multidimensional fields. A convolutional tensor in a CNN may be a 4-dimensional tensor where the first 2 dimensions are the output and input of the convolutional layer and the remaining 2 dimensions are the spatial dimensions. The first sparsification step does not require iterative pruning and can achieve a desired sparsity level for the first step through one-shot pruning. The method also includes a second sparsification step that further reduces the size of the CNN through tensor decomposition. With the two sparsification steps, the method generates a reduced tensor from an individual convolutional tensor.

The method integrates the reduced tensor into the CNN. In some embodiments, the method generates convolutional operations based on the result of the tensor decomposition and generates a convolutional flow that includes the convolutional operations and the reduced tensor. The method replaces the convolutional tensors in the CNN with the corresponding convolutional flows, which results in a new CNN having a smaller size. In some embodiments, the method may also fine-tune the new CNN, e.g., by re-training the new CNN, to improve the performance of the new CNN. The performance of the new CNN can reach a satisfying level through a number of epochs that is significantly smaller than the number of epochs used for initially training the CNN.

By using the two sparsification steps, the method in the present invention can achieve a higher sparsity level than other CNN compression approaches. The method can recover model accuracy lost in the two sparsification steps through the fine-tuning process and provide a better model accuracy than the other CNN compression approaches. Thus, compared with, more significant reduction in model size, runtime, and energy consumption can be obtained at the cost of minimal loss in accuracy. Further, the compression method itself requires less computing resource and time than many other CNN compression approaches. For instance, the method needs less computing resource and time for filter pruning by using one-shot pruning, as opposed to iterative pruning used in the LTP approach.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example CNN Architecture

FIG. 1 illustrates an architecture of an example CNN 100, in accordance with various embodiments. For purpose of illustration, the CNN 100 in FIG. 1 is a Visual Geometry Group (VGG)-based CNN. In other embodiments, the CNN 100 may be other types of CNNs. The CNN 100 is trained to receive images and output classifications of objects in the images. In the embodiment of FIG. 1, the CNN 100 receives an input image 105 that includes objects 115, 125, and 135. The CNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the CNN 100 may include fewer, more, or different layers.

The convolutional layers 110 summarize the presence of features in the input image 105. The convolutional layers 110 function as feature extractors. The first layer of the CNN 100 is a convolutional layer 110. In an example, a convolutional layer 110 performs a convolution to an input 140 by using a kernel 150, generates an output 160 from the convolution, and passes the output 160 to the next layer in the sequence. For the first convolutional layer 110, which is also the first layer of the CNN 100, the input 140 is the input image 105. For the other convolutional layers, the input 140 may be an output of another convolutional layer 110 or an output of a pooling layer 120. The kernel 150 includes a set of filters. The convolution is a linear operation that involves the multiplication of the filters with the input 140. A filter may be a 2-dimensional array of weights. Weights of the filters can be initialized and updated by backpropagation using gradient descent. The magnitudes of the weights of the filters can indicate importance of the filters in extracting features from the input 140. The filter is smaller than the input 140.

The multiplication applied between a filter-sized patch of the input 140 and the filter may be a dot product. A dot product is the element-wise multiplication between the filter-sized patch of the input 140 and the corresponding filter, which is then summed, always resulting in a single value. Because it results in a single value, the operation is often referred to as the "scalar product." Using a filter smaller than the input 140 is intentional as it allows the same filter (set of weights) to be multiplied by the input 140 multiple times at different points on the input 140. Specifically, the filter is applied systematically to each overlapping part or filter-sized patch of the input 140, left to right, top to bottom. The result from multiplying the filter with the input 140 one time is a single value. As the filter is applied multiple times to the input 140, the output 160 is a two-dimensional array of output values that represent a filtering of the input 140. As such, the 2-dimensional output array from this operation is referred to a "feature map."

In an example, the input 140 can be represented by an input tensor X of size H×W×S and the output 160 can be represented by an output tensor Y of size H'×W'×T. The convolution maps the input tensor X into the output tensor Y using the following linear mapping:

$$Y_{h',w',t} = \sum_{i=1}^{D}\sum_{j=1}^{D}\sum_{s=1}^{S} K_{i,j,s,t} X_{h_i,w_j,s}$$

$$h_i = (h'-1)\Delta + i - P$$

$$w_j = (w'-1)\Delta + j - P$$

where K is a tensor of the kernel 150, which is a 4-dimensional tensor of size D×D×S×T, Δ is a stride, and P is zero-padding size.

In some embodiments, after a feature map (i.e., the output 160) is created, each value in the feature map can be passed through a nonlinearity, such as a rectified linear activation function (ReLU). The ReLU is a calculation that returns the value provided as input directly, or the value 0 if the input is 0 or less. The convolutional layer 110 may receive several images as input and calculates the convolution of each of them with each of the filters. This process can be repeated several times. For instance, the output 160 is passed to the subsequent convolutional layer 110 (i.e., the convolutional layer 110 following the convolutional layer 110 generating the output 160 in the sequence). The subsequent convolutional layers 110 performs a convolution on the output 160 with new filters and generates a new feature map. The new feature map may also be normalized and resized. The new feature map can be filtered again by a further subsequent convolutional layer 110, and so on.

In some embodiments, a convolutional layer 110 has four hyperparameters: the number of filters, the size F filters (e.g., a filter is of dimensions F×F×D pixels), the S step with which the window corresponding to the filter is dragged on the image (e.g., a step of 1 means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depth-wise separable convolution, transposed convolution, and so on. The CNN 100 includes 16 convolutional layers 110. In other embodiments, the CNN 100 may include a different number of convolutional layers.

The pooling layers 120 down sample feature maps generated by the convolutional layers, e.g., by summarizing the presents of features in the patches of the feature maps. A pooling layer 120 is placed between two convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110 after a nonlinearity (e.g., ReLU) has been applied to the feature maps output by the convolutional layer 510.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the CNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the CNN. The fully connected layers 130 may be convolutional or not. The fully connected layers 130 receives an input vector. The input vector defines the output of the convolutional layers 110 and pooling layers 120 and includes the values of the last feature map generated by the last pooling layer 120 in the sequence. The fully connected layers 130 applies a linear combination and an activation function to the input vector and generates an output vector. The output vector may contain as many elements as there are classes: element i represents the probability that the image belongs to class i. Each element is therefore between 0 and 1, and the sum of all is worth 1. These probabilities are calculated by the last fully connected layer 130 by using a logistic function (binary classification) or a softmax function (multi-class classification) as an activation function.

In some embodiments, the fully connected layers 130 classify the input image 105 and returns a vector of size N, where N is the number of classes in the image classification problem. In the embodiment of FIG. 1, N equals 3, as there are three objects 115, 125, and 135 in the input image. Each element of the vector indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input vector by the matrix containing the weights. In an example, the output vector includes three probabilities: a first probability indicating the object 115 being a tree, a second probability indicating the object 125 being a car, and a third probability indicating the object 135 being a person. In other embodiments where the input image 105 includes different objects or a different number of objects, the output vector can be different.

Example DL Environment

Figure 2:
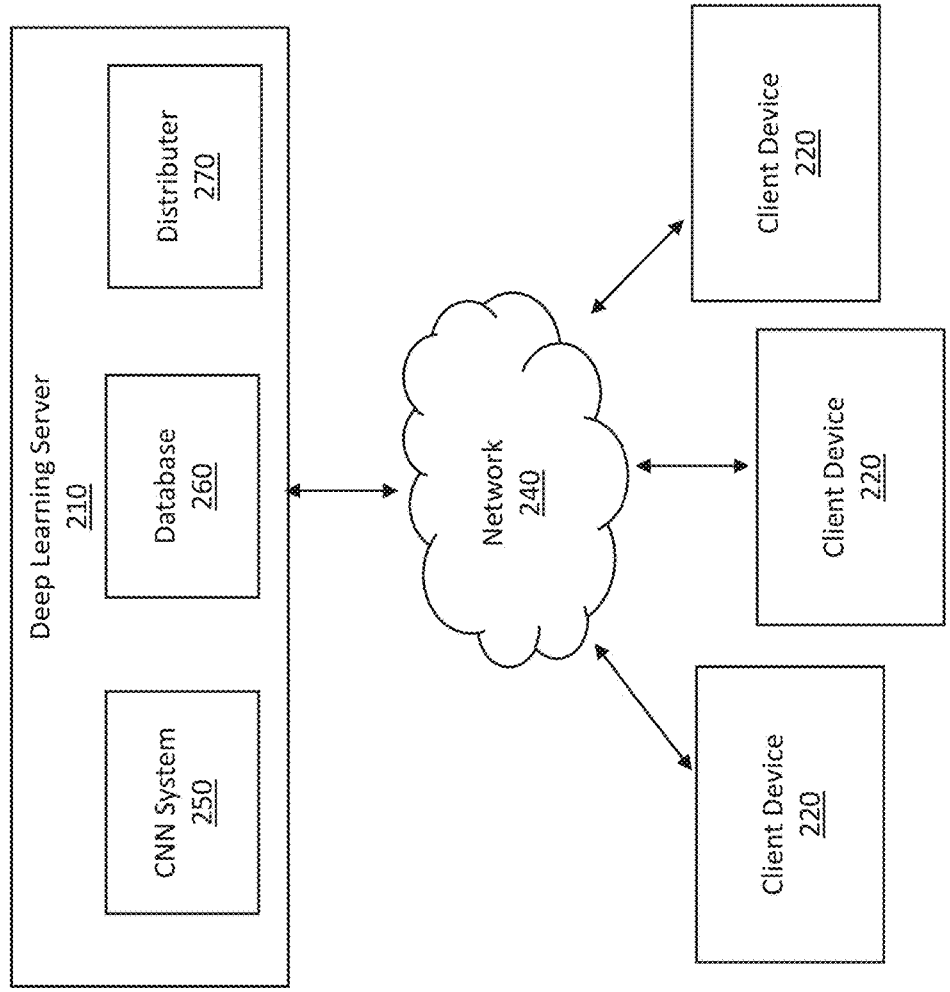
FIG. 2 illustrates a deep learning environment, in accordance with various embodiments.

FIG. 2 illustrates a DL environment 200, in accordance with various embodiments. The DL environment 200 includes a DL server 210 and a plurality of client devices 220 (individually referred to as client device 220). The DL server 210 is connected to the client devices 220 through a network 240. In other embodiments, the DL environment 200 may include fewer, more, or different components.

The DL server 210 trains DL models using neural networks. A neural network is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The DL server 210 can use various types of neural networks, such as CNN, recurrent neural network (RNN), generative adversarial network (GAN), long short term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 210 may build DL models specific to particular types of problems that need to be solved. A DL model is trained to receive an input and outputs the solution to the particular problem.

In FIG. 2, the DL server 210 includes a CNN system 250, a database 260, and a distributer 270. The CNN system 250 trains CNNs. The CNNs can be used to process images, e.g., images captured by autonomous vehicles, medical devices, satellites, and so on. In an embodiment, a CNN receives an input image and outputs classifications of objects in the input image. An example of the CNNs is the CNN 100 described above in conjunction with FIG. 1. The CNN system also compresses the trained CNNs to reduce the sizes of the trained CNNs. As the compressed CNNs has a smaller size, application of the compressed CNNs requires less time and computing resources (e.g., memory, processor, etc.) compared with uncompressed CNNs. The compressed CNNs may be used on low memory systems, like mobile phones, IOT edge devices, and so on.

The database 260 stores data received, used, generated, or otherwise associated with the DL server 210. For example, the database 260 stores a training dataset that the CNN system 250 uses to train CNNs. In an embodiment, the training dataset is an image gallery that can be used to train a CNN for classifying images. The training dataset may include data received from the client devices 220. As another example, the database 260 stores hyperparameters of the neural networks built by the DL server 210.

The distributer 270 distributes DL models generated by the DL server 210 to the client devices 220. In some embodiments, the distributer 270 receives a request for a CNN from a client device 220 through the network 240. The request may include a description of a problem that the client device 220 needs to solve. The request may also include information of the client device 220, such as information describing available computing resource on the client device. The information describing available computing resource on the client device 220 can be information indicating network bandwidth, information indicating available memory size, information indicating processing power of the client device 220, and so on. In an embodiment, the distributer may instruct the CNN system 250 to generate a CNN in accordance with the request. The CNN system 250 may generate a CNN based on the description of the problem. Alternatively or additionally, the CNN system 250 may compress a CNN based on the information describing available computing resource on the client device.

In another embodiment, the distributer 270 may select the CNN from a group of pre-existing CNNs based on the request. The distributer 270 may select a CNN for a particular client device 230 based on the size of the CNN and available resources of the client device 230. In embodiments where the distributer 270 determines that the client device 230 has limited memory or processing power, the distributer 270 may select a compressed CNN for the client device 230, as opposed to an uncompressed CNN that has a larger size. The distributer 270 then transmits the CNN generated or selected for the client device 220 to the client device 220.

In some embodiments, the distributer 270 may receive feedback from the client device 220. For example, the distributer 270 receives new training data from the client device 220 and may send the new training data to the CNN system 250 for further training the CNN. As another example, the feedback includes an update of the available computer resource on the client device 220. The distributer 270 may send a different CNN to the client device 220 based on the update. For instance, after receiving the feedback indicating that the computing resources of the client device 220 have been reduced, the distributer 270 sends a CNN of a smaller size to the client device 220.

The client devices 220 receive CNNs from the distributer 270 and applies the CNNs to solve problems, e.g., to classify objects in images. In various embodiments, the client devices 220 input images into the CNNs and uses the output of the CNNs for various applications, e.g., visual reconstruction, augmented reality, robot localization and navigation, medical diagnosis, weather prediction, and so on. A client device 220 may be one or more computing devices capable of receiving user input as well as transmitting and/or receiving data via the network 240. In one embodiment, a client device 220 is a conventional computer system, such as a desktop or a laptop computer. Alternatively, a client device 220 may be a device having computer functionality, such as a personal digital assistant (PDA), a mobile telephone, a smartphone, an autonomous vehicle, or another suitable device. A client device 220 is configured to communicate via the network 240. In one embodiment, a client device 220 executes an application allowing a user of the client device 220 to interact with the DL server 210 (e.g., the distributer 270 of the DL server 210). The client device 220 may request CNNs or send feedback to the distributer 270 through the application. For example, a client device 220 executes a browser application to enable interaction between the client device 220 and the DL server 210 via the network 240. In another embodiment, a client device 220 interacts with the DL server 210 through an application programming interface (API) running on a native operating system of the client device 220, such as IOS® or ANDROID™.

In an embodiment, a client device 220 is an integrated computing device that operates as a standalone network-enabled device. For example, the client device 220 includes display, speakers, microphone, camera, and input device. In another embodiment, a client device 220 is a computing device for coupling to an external media device such as a television or other external display and/or audio output system. In this embodiment, the client device 220 may couple to the external media device via a wireless interface or wired interface (e.g., an HDMI cable) and may utilize various functions of the external media device such as its display, speakers, microphone, camera, and input devices. Here, the client device 220 may be configured to be compatible with a generic external media device that does not have specialized software, firmware, or hardware specifically for interacting with the client device 220.

The network 240 supports communications between the DL server 210 and client devices 220. The network 240 may comprise any combination of local area and/or wide area networks, using both wired and/or wireless communication systems. In one embodiment, the network 240 may use standard communications technologies and/or protocols. For example, the network 240 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 240 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 240 may be represented using any suitable format, such as hypertext markup language (HTML) or extensible markup language (XML). In some embodiments, all or some of the communication links of the network 240 may be encrypted using any suitable technique or techniques.

Example CNN System

Figure 3:
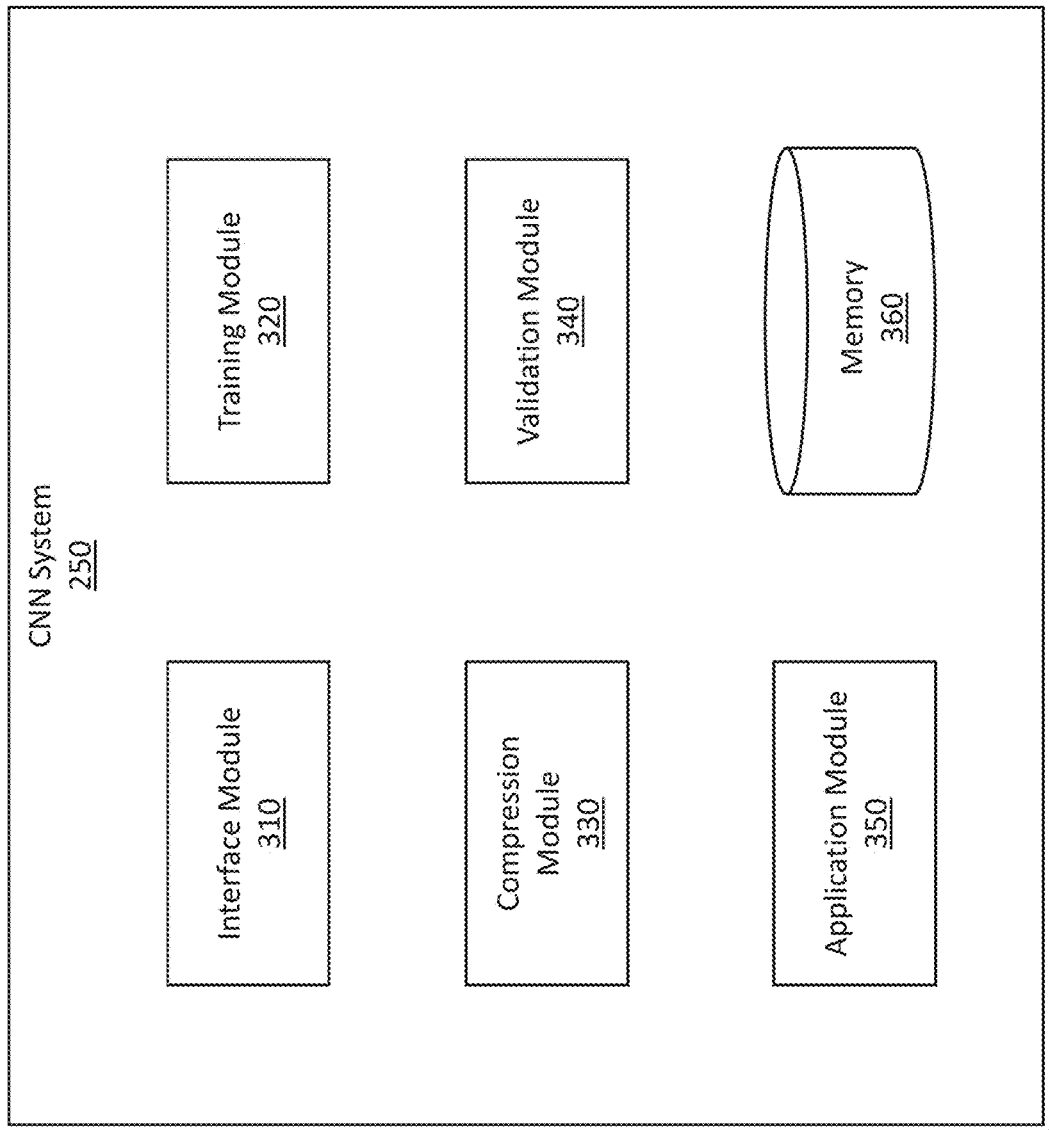
FIG. 3 is a block diagram of a CNN system, in accordance with various embodiments.

FIG. 3 is a block diagram of the CNN system 250, in accordance with various embodiments. The CNN system 250 trains and compresses CNNs. In other embodiments, the CNN system 250 can train or compress other types of deep neural networks, such as RNNs, and so on. The CNN system 250 can train and compress CNNs that can be used to recognize object in images. In other embodiments, the CNN system 250 can be applied to train DL models for other tasks, such as learning relationships between biological cells (e.g., DNA, proteins, etc.), control behaviors for devices (e.g., robots, machines, etc.), and so on. The CNN system 250 includes an interface module 310, a training module 320, a compression module 330, a validation module 340, an application module 350, and a memory 360. In other embodiments, alternative configurations, different or additional components may be included in the CNN system 250. Further, functionality attributed to a component of the CNN system 250 may be accomplished by a different component included in the CNN system 250 or a different system.

The interface module 310 facilitates communications of the CNN system 250 with other systems. For example, the interface module 310 establishes communications between the CNN system 250 with an external database to receive data that can be used to train CNNs or input into CNNs to perform tasks. As another example, the interface module 310 supports the CNN system 250 to distribute CNNs to other systems, e.g., computing devices configured to apply CNNs to perform tasks.

The training module 320 trains CNNs by using a training dataset. The training module 320 forms the training dataset. In an embodiment where the training module 320 trains a CNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the CNN, and the rest of the training dataset may be held back as a tuning subset used by the compression module 330 to tune a compressed CNN or as a validation subset used by the validation module 340 to validate performance of a trained or compressed CNN. The portion of the training dataset not including the tuning subset and the validation subset may be used to train the CNN.

The training module 320 also determines hyperparameters for training the CNN. Hyperparameters are variables specifying the CNN training process. Hyperparameters are different from parameters inside the CNN (e.g., weights of filters). In some embodiments, hyperparameters include variables determining the architecture of the CNN, such as number of hidden layers, etc. Hyperparameters also include variables which determine how the CNN is trained, such as batch size, number of epochs, etc. A batch size defines the number of training samples to work through before updating the parameters of the CNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the CNN. An epoch may include one or more batches. The number of epochs may be 10, 100, 500, 1000, or even larger.

The training module 320 defines the architecture of the CNN, e.g., based on some of the hyperparameters. The architecture of the CNN includes an input layer, an output layer, and a plurality of hidden layers. The input layer of a CNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as rectified liner unit (ReLU) layers, pooling layers, fully connected layers, normalization layers, softmax or logistic layers, and so on. The convolutional layers of the CNN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

The training module 320 inputs the training dataset into the CNN and modifies the parameters inside the CNN to minimize the error between the generated labels of objects in the training images and the training labels. The parameters include weights of filters in the convolutional layers of the CNN. In some embodiments, the training module 210 uses a cost function to minimize the error. After the training module 320 finishes the predetermined number of epochs, the training module 320 may stop updating the parameters in the CNN. The CNN having the updated parameters is referred to as a trained CNN.

The compression module 330 compresses trained CNNs to reduce complexity of the trained CNNs at the cost of small loss in model accuracy. The compression module 330 converts some or all of the convolutional tensors in a trained CNN into reduced tensors that have reduced dimensions from the corresponding convolutional tensors. The compression module 330 then integrates the reduced tensors into the trained CNN to reduce the complexity of the trained CNN. In some embodiments, the compression module 330 prunes a subset of the filters in a convolutional layer to generate a sparse tensor and then decomposes the sparse tensor to generate the reduced tensor of the convolutional layer. The compression module 330 compresses the trained CNN by removing the convolutional tensor from the network and placing the reduced tensor into the network. As the reduced tensor has a lower rank than the convolutional tensor, the reduced tensor cannot be placed into the network directly. The compression module 330 generates convolutional operations to facilitate integration of the reduced tensor. After some or all of the convolutional tensor in the trained CNN is removed and their reduced tensors are integrated, a compressed CNN is generated. The compression module 330 may fine-tune the compressed CNN. For instance, the compression module 330 uses the training dataset, or a subset of the training dataset, to train the compressed CNN. As the compressed CNN is converted from the pre-trained CNN, the fine-tuning process is a re-training process. The compression module 330 may re-train the compressed CNN for a smaller number of epochs than the number of epochs used by the training module 220 to initially train the CNN. For instance, the number of epochs for re-training the compressed CNN may be 5%-20% of the number of epochs for initially training the CNN. During forward and back-propagation through the compressed CNN, the reduced tensors and convolutional operations represent, collectively, a sequence of linear and differentiable operations that can be used as standard feed-forward layers in a CNN and are trainable using standard backpropagation processes. More details about the compression module 330 are described below in conjunction with FIG. 2.

The validation module 340 verifies accuracy of trained or compressed CNN. In some embodiments, the validation module 340 inputs samples in a validation dataset into the CNN and uses the outputs of the CNN to determine the model accuracy. In some embodiments, a validation dataset may be formed of some or all the samples in the training dataset. Additionally or alternatively, the validation dataset includes additional samples, other than those in the training sets. In some embodiments, the validation module 340 determines may determine an accuracy score measuring the precision, recall, or a combination of precision and recall of the CNN. The validation module 340 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 340 may compare the accuracy score with a threshold score. In an example where the validation module 340 determines that the accuracy score of the augmented model is lower than the threshold score, the validation module 340 instructs the training module 320 or the compression module 330 to re-train the CNN. In one embodiment, the training module 320 or the compression module 330 may iteratively re-train the CNN until the occurrence of a stopping condition, such as the accuracy measurement indication that the CNN may be sufficiently accurate, or a number of training rounds having taken place.

In some embodiments, the validation module 340 instructs the compression module 330 to compress CNNs. For example, the validation module 340 may determine whether an accuracy score of a compressed CNN is above a threshold score. In response to determining that the accuracy score of a compressed CNN is above a threshold score, the validation module 340 instructs the compression module 330 to further compress the CNN, e.g., by compressing an uncompressed convolutional layer in the CNN. In an embodiment, the validation module 340 may determine a compression rate based on the accuracy score and instructs the compression module 330 to further compress the CNN based on the compression rate. The compression rate, e.g., is a percentage indicating the reduced size of the CNN from compression.

The application module 350 applies the trained or compressed CNN to perform tasks. For instance, the application module 350 inputs images into the CNN. The CNN outputs classifications of objects in the images. As an example, the CNN may be provisioned in a security setting to detect malicious or hazardous objects in images captured by security cameras. As another example, the CNN may be provisioned to detect objects (e.g., road signs, hazards, humans, pets, etc.) in images captured by cameras of an autonomous vehicle. The input to the CNN may be formatted according to a predefined input structure mirroring the way that the training dataset was provided to the CNN. The CNN may generate an output structure which may be, for example, a classification of the image, a listing of detected objects, a boundary of detected objects, or the like. In some embodiments, the application module 350 distributes the CNN to other systems, e.g., computing devices in communication with the CNN system 250, for the other systems to apply the CNN to perform the tasks.

The memory 360 stores data received, generated, used, or otherwise associated with the CNN system 250. For example, the memory 360 stores the datasets used by the training module 320, compression module 330, and the validation module 350. The memory 360 may also store data generated by the training module 320, compression module 330, and the validation module 350, such as the hyperparameters for training CNNs, algorithms for compressing CNNs, etc. The memory 360 may further store CNNs generated by the training module 320 and the compression module 330. In the embodiment of FIG. 1, the memory 360 is a component of the CNN system 250. In other embodiments, the memory 360 may be external to the CNN system 250 and communicate with the CNN system 250 through a network.

Example Compression Module

Figure 4:
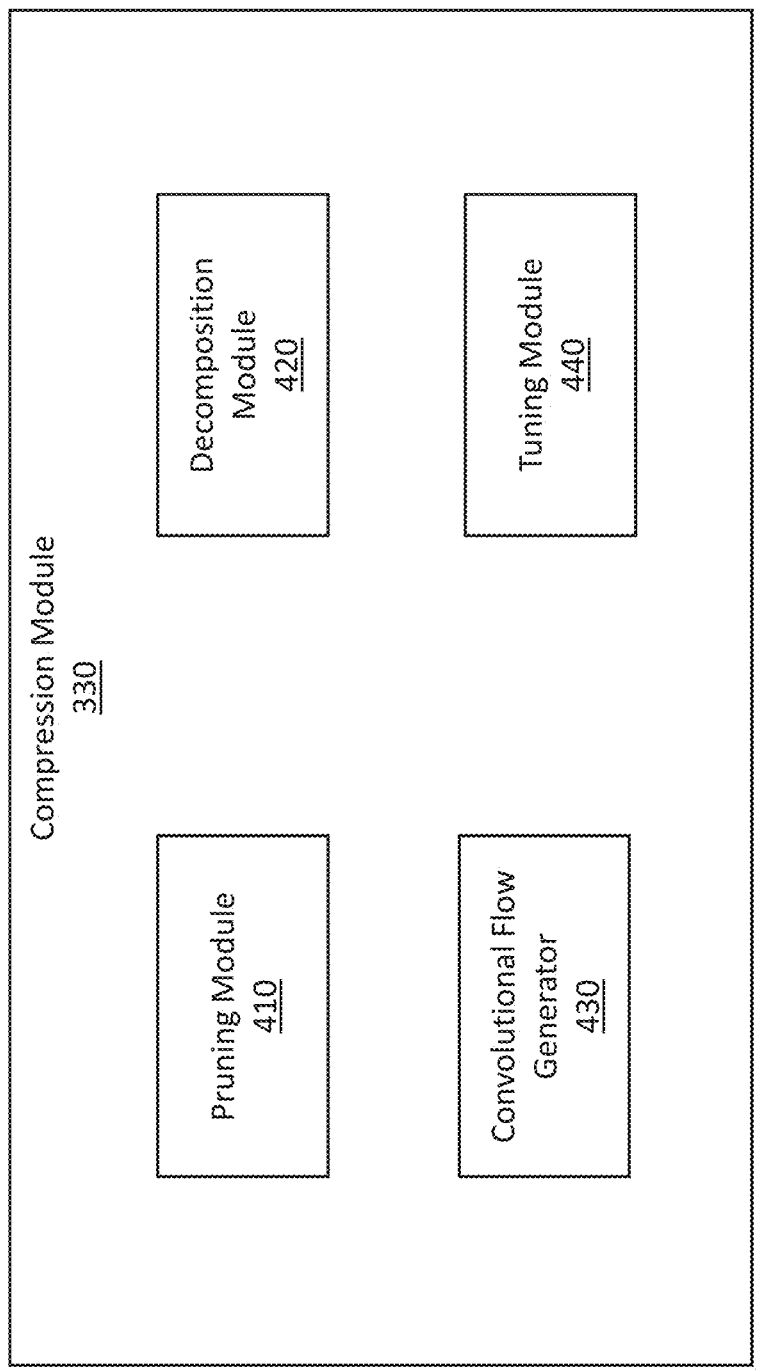
FIG. 4 is a block diagram of a compression module, in accordance with various embodiments.

FIG. 4 is a block diagram of the compression module 330, in accordance with various embodiments. In the embodiment of FIG. 2, the compression module 330 includes a pruning module 410, a decomposition module 420, a convolutional flow module 430, and a tuning module 440. In other embodiments, alternative configurations, different or additional components may be included in the compression module 330. Further, functionality attributed to a component of the compression module 330 may be accomplished by a different component included in the compression module 330, a different module, or a different system.

The pruning module 410 prunes filters of convolutional tensors of CNNs. In some embodiments, the pruning module 410 retrieves a pre-trained CNN including a plurality of convolution tensors. A convolutional tensor includes one or more input channels, a set of filters (i.e., the kernel tensor), and one or more output channels. An example of the pre-trained CNN is the CNN 100 in FIG. 1. The pruning module 410 applies filter magnitude pruning to one or more convolutional tensors of the CNN. In an embodiment, the pruning module 410 applies the filter magnitude pruning to each of the convolutional tensors in the CNN.

In a filter magnitude pruning process, the pruning module 410 identifies, from the filters of a convolutional tensor, filters that have a relatively large magnitude, e.g., larger than an average magnitude of the weights of the filters or larger than the magnitudes of the remaining filters. The remaining filters in the convolutional tensor are pruned. The pruning module 410 may set the magnitudes of the remaining filters to zero. Alternatively, the pruning module 410 may identify filters, the weights of which have relatively low magnitude, and prunes the identified filters. In an embodiment, the pruning module 410 uses the following algorithm to perform filter magnitude pruning:

$$\mathrm{argmin}_{K \in L} \sum_{i,j} |K_{ij}|$$

where L denotes the convolutional layer, K is a filter (e.g., a 3×3 array), and the indices (i,j) vary over the filter indices. The pruning module 410 prunes the filters for which the sum of components in absolute magnitude is minimum. In some embodiments, the pruning module 410 prunes the remaining filters by setting the remaining filters and their weights to zero.

The pruning module 410 may prune the filters of a convolutional layer at a predetermined prune rate, i.e., a predetermined ratio of the number of filters being pruned to the total number of filters of the convolutional layer. In some embodiments, the prune rate is in a range from 10% to 25%. In other embodiments, the prune rate may be different. The pruning module 410 may perform a single round of filter magnitude pruning on the convolutional layer. Compared with the LTP approach that prunes one convolutional layer over multiple training iterations, the pruning module 410 can prune filters with a better efficiency and less computing resource. As a result of the filter magnitude pruning, the pruning module 410 reduces the size of the kernel tensor and generates a sparse tensor. The sparse tensor includes the un-pruned filters. More information about filter pruning is described below in conjunction with FIG. 5.

The decomposition module 420 decomposes sparse tensors generated by the pruning module 410 and generates low-rank approximations of the sparse tensors. The low-rank approximation of a sparse tensor includes a core tensor and a plurality of principal tensors. The core tensor has a reduced size than the sparse tensor. The core tensor is also referred to as a reduced tensor. In an embodiment, the low-rank approximation includes three principal tensors, each of which is a two-dimensional matrix. An example of the low-rank approximation can be represented by:

$$\min_{\hat{x}} \|F - \hat{F}\|$$

$$\hat{F} = G \times A \times B \times C = \Sigma_{p=1}^{P} \Sigma_{q=1}^{Q} \Sigma_{q=1}^{R} g_{pqr} a_r \odot b_r \odot c_r$$

where F is a sparse tensor; $\hat{F}$ is the low-rank approximation of the sparse tensor, which is the result of the decomposition; the symbol ⊙ denotes a vector outer product; G is the core tensor in the decomposition; and A,B,C are principal tensors. As $\hat{F}$ is a low-rank approximation of the sparse tensor F, F=$\hat{F}$ and F is determined by minimizing its difference with F. The decomposition module 420 may apply the decomposition algorithm to the axes corresponding with the number of input and output filters and leave the filter sizes uncompressed.

In some embodiments, the decomposition module 420 applies a Tucker decomposition algorithm. Tucker decomposition of 4-dimensional sparse tensor $\hat{F}$ may have the form:

$$\hat{F}_{i,j,s,t} = \Sigma_{r_1=1}^{R_1} \Sigma_{r_2=1}^{R_2} \Sigma_{r_3=1}^{R_3} \Sigma_{r_4=1}^{R_4} G_{r_1,r_2,r_3,r_4} U_{i,r_1}^{(1)} U_{j,r_2}^{(2)} U_{s,r_3}^{(3)} U_{t,r_4}^{(4)}$$

where G is a core tensor of size $R_1 \times R_2 \times R_3 \times R_4$ and $U^{(1)}$, $U^{(2)}$, $U^{(3)}$, and $U^{(4)}$ are factor matrices of sizes $D \times R_1$, $D \times R_2$, $S \times R_3$, and $T \times R_4$, respectively. The core tensor G is a 4-rank $(R_1, R_2, R_3, R_4)$ tensor. A rank (R) of a tensor is the total number of contravariant and covariant indices of the tensor. In some embodiments of the Tucker decomposition, every mode does not have to be decomposed. For instance, tensor-1 and tensor-2 associated with spatial dimensions are not decomposed because they are relatively small (D may be 3 or 5). Such a decomposition method is referred to as Tucker-2 decomposition. Using Tucker-2 decomposition, the sparse tensor $\hat{K}$ is decomposed to:

$$\hat{F}_{i,j,s,t} = \Sigma_{r_3=1}^{R_3} \Sigma_{r_4=1}^{R_4} G_{i,j,r_3,r_4} U_{s,r_3}^{(3)} U_{t,r_4}^{(4)}$$

where G is a core tensor of size $D \times D \times R_3 \times R_4$. The ranks $(R_3, R_4)$ are very important hyperparameters which control the trade-off between performance (memory, speed, energy) improvement and accuracy loss. The Tucker-2 decomposition of this 4-dimensional sparse tensor results in a set of 2D-matrices U along each of the dimensions of the tensor (also called modes) and a core tensor G. A trade-off between space and accuracy can be achieved by varying the ranks of the output core tensor and factor matrices. More information about the low-rank approximation is described below in conjunction with FIG. 6.

The convolutional flow module 430 generates convolutional flows based on the low-rank approximations of sparse tensors. In some embodiments, the convolutional flow module 430 converts a low-rank approximation into a sequence of convolutional operations. In an embodiment, the sequence includes three convolutional operations: a 1×1 convolution, followed by a D×D convolution, followed by another 1×1 convolution. D is an integral number larger than 1. In an example, D is 3, 4, or 5. As the core tensor has a smaller size than the convolutional tensor, the core tensor will not be compatible with the pre-trained CNN if it replaces the convolutional tensor directly. Here, the convolutional flow is used to seamlessly integrate the core tensor into the pre-trained CNN architecture while maintaining differentiability with respect to backpropagation of the network.

The 1×1 convolution reduces dimensions of the input tensor. For instance, the 1×1 convolution performs pixel-wise linear re-combination of the input tensor. The D×D convolution to the reduced input tensor is applied after dimensional reduction with the 1×1 convolution. In some embodiments, there is no nonlinear ReLU function applied after the D×D convolution. The D×D convolution results in a reduced output tensor. Then another 1×1 convolution is applied to the reduced output tensor to recover the size of the reduced output tensor to the size of the output tensor. Thus, two compression techniques are combined to generate the convolutional flow.

The convolutional flow module 430 generates a compressed CNN by replacing the convolutional tensors with the corresponding convolutional flows. More details about the convolutional flow are described below in conjunction with FIG. 7.

The tuning module 440 fine-tunes compressed CNNs. As the compressed CNNs are generated from pre-trained CNNs. The fine-tuning process is a re-training process. In some embodiments, the tuning module 440 re-trains a compressed CNN by using the same training dataset that the training module 120 used to train the pre-trained CNN. The tuning module 440 may re-train the compressed CNN for a smaller number of epochs than the number of epochs used by the training module 120 to train the pre-trained CNN. In an embodiment, the number of epochs used for fine-tuning the compressed CNN is 5%-20% of the number of epochs used for training the pre-trained CNN. In some embodiments, the tuning module 440 may use a different training dataset to re-train the compressed CNN. The re-training process can allow the network to holistically calibrate the new compressed tensors.

Example Filter Pruning

Figure 5:
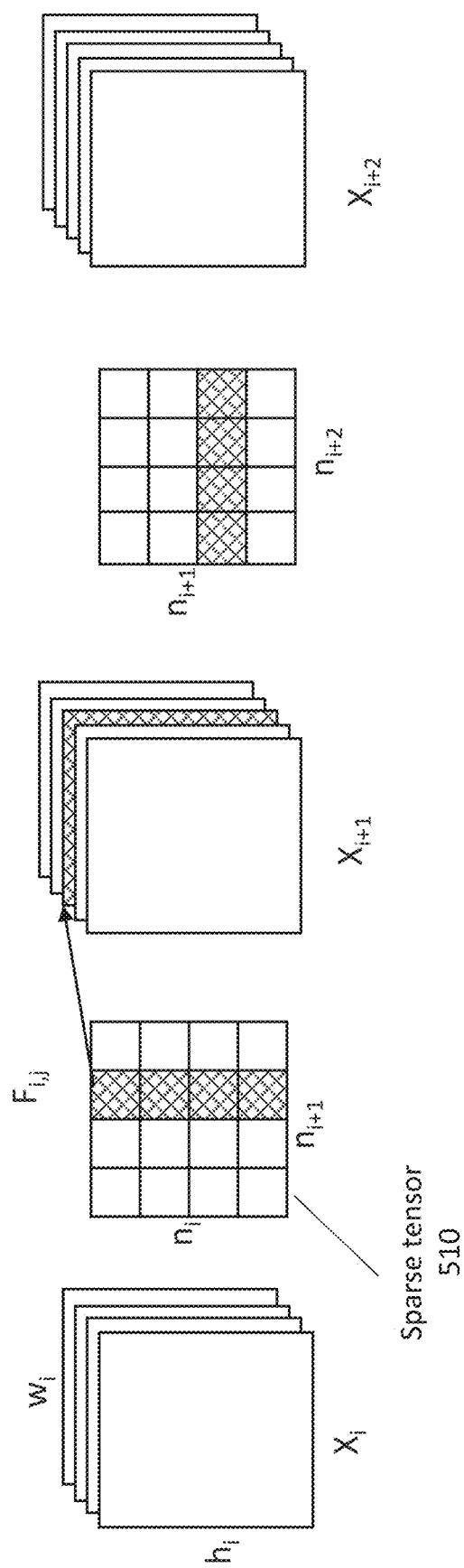
FIG. 5 illustrates filter pruning perform on a convolutional layer of the CNN, in accordance with various embodiments.

FIG. 5 illustrates filter pruning performed on a convolutional layer 110 of the CNN 100, in accordance with various embodiments. In the embodiment of FIG. 5, the convolutional layer 110 is the i-th convolutional layer of the CNN 100. The convolutional layer 110 receives feature maps (input feature maps $X_i$) and performs a convolution to convert the input feature maps $X_i$ to output feature maps $X_{i+1}$. The convolutional layer 110 has multiple input channels. The number of input channels of the convolutional layer 110 is $n_i$. The input tensor $X_i$ has a height hi and width $w_i$. The convolutional layer 110 converts the input feature maps $X_i \in \mathbb{R}^{n_i \times h_i \times w_i}$ into the output feature maps $X_{i+1} \in \mathbb{R}^{n_{i+1} \times h_{i+1} \times w_{i+1}}$. The output feature maps $X_{i+1}$ can be used as input feature maps for the subsequent convolutional layer 110. The convolutional layer 110 performs the convolution by applying ni+1 3D filters $F_{i,j} \in \mathbb{R}^{n_i \times k \times k}$ on the $n_i$ input channels, in which one filter generates one feature. Each filter is composed by $n_i$ 2D kernels $K \in \mathbb{R}^{k \times k}$ (e.g., 3×3). All the filters, together, constitute the kernel matrix (i.e., convolutional tensor) $F_i \in \mathbb{R}^{n_i \times n_{i+1} \times k \times k}$. The number of operations of the convolutional layer is $n_{i+1} n_i k^2_{i+1} n_i k^2 h_{i+1} w_{i+1}$.

In FIG. 5, a filter $F_{i,j}$ is pruned, e.g., by the pruning module 410. As a result of the pruning, a sparse tensor 510 is generated. Also, the corresponding feature map $X_{i+1,j}$ is removed, which reduces $n_i k^2 h_{i+1} w_{i+1}$ operations. The kernels that apply on the removed feature maps from the filters of the next convolutional layer are also removed, which saves an additional $n_{i+2} k^2 h_{i+2} w_{i+2}$ operations. Pruning m filters of the convolutional layer 110 will reduce $m/n_{n+1}$ of the computation cost for both the convolutional layer 110 (i.e., the i-th layer) and the subsequent convolutional layer (i.e., the (i+1)-th layer).

Example Low-Rank Approximation

Figure 6:
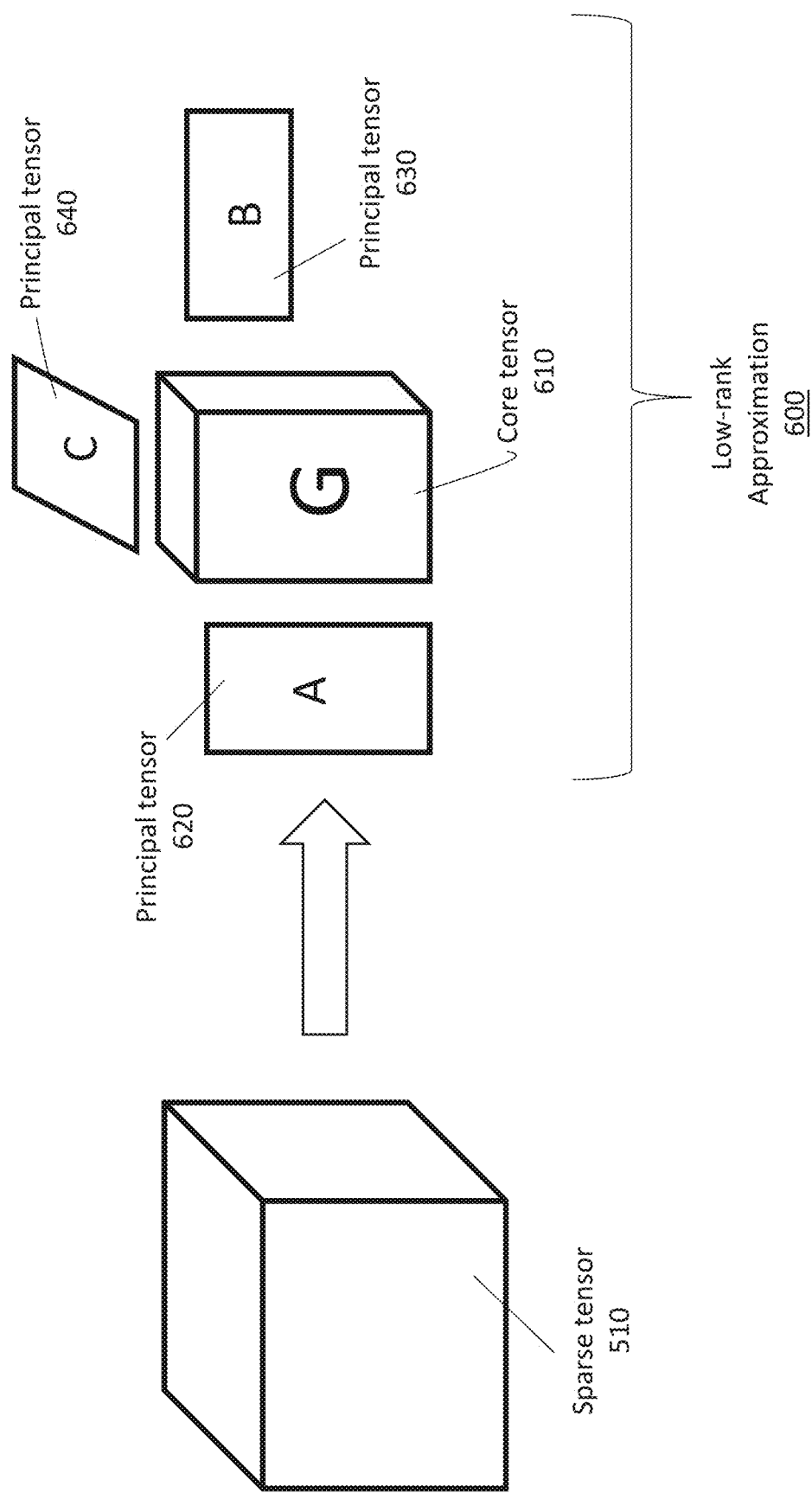
FIG. 6 illustrates a low-rank approximation of a sparse tensor, in accordance with various embodiments.

FIG. 6 illustrates a low-rank approximation 600 of the sparse tensor 510, in accordance with various embodiments. The sparse tensor 510 is represented by a box in FIG. 6. The sparse tensor 510 can be the sparse tensor F described above in conjunction with FIG. 4. The low-rank approximation 600 can be the low-rank approximation $\hat{F}$. The low-rank approximation 600 includes a core tensor 610 and three principal tensors 620, 630, and 640. The core tensor 610 is the core tensor G described above in conjunction with FIG. 4. Similarly, the principal tensors 620, 630, and 630 are the principal tensors A, B, and C described above in conjunction with FIG. 4. As described above, as $\hat{F}$ is a low-rank approximation of the tensor F, it follows that $F \approx \hat{F}$. In an example, if $F \in \mathbb{R}^{I \times J \times k}$, then $G \in \mathbb{R}^{P \times Q \times R}$, $A \in \mathbb{R}^{I \times P}$, $B \in \mathbb{R}^{J \times Q}$, $\mathbb{R} \in \mathbb{R}^{K \times R}$.

Example Convolutional Flow

Figure 7:
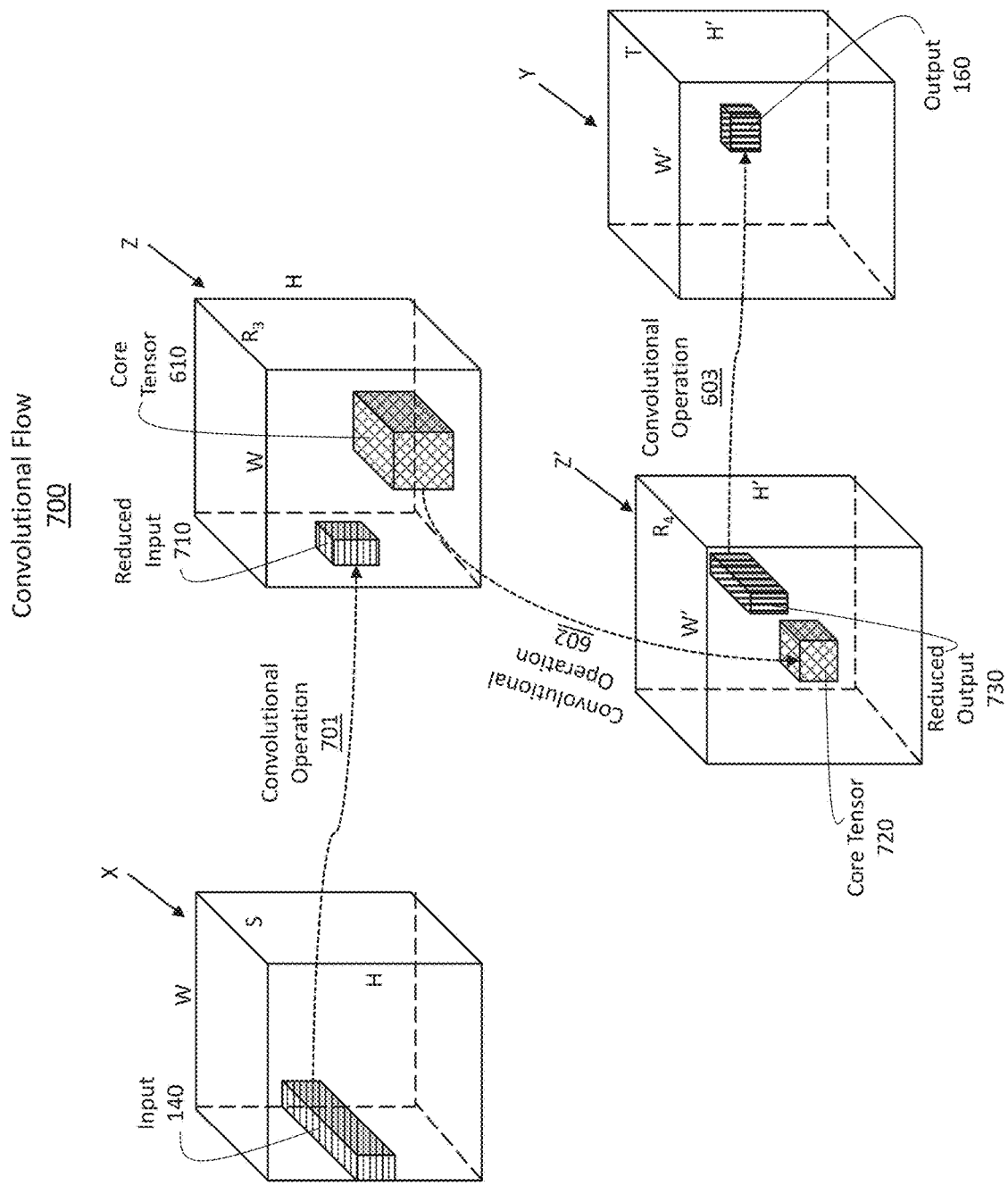
FIG. 7 illustrates an example convolutional flow, in accordance with various embodiments.

FIG. 7 illustrates an example convolutional flow 700, in accordance with various embodiments. The convolutional flow 700 includes three convolutional operations 701, 702, and 703. The convolutional flow 700 is generated based on the low-rank approximation 600 in FIG. 6. The convolutional flow 700 can be used to replace the corresponding convolutional layer 110 in the CNN 100 to reduce the size of the CNN 100. The convolutional operations 701, 702, and 703 facilitates the integration of the core tensor 610 of the low-rank approximation into the architecture of the CNN 100.

In FIG. 7, the transparent boxes represent 3-way tensors X, Z, Z', and Y, with two frontal sides of each transparent box corresponding to spatial dimensions. As discussed above, X includes the input 140 of the corresponding convolutional layer 110 and has a size of H×W×S. Y includes the output 150 of the corresponding convolutional layer and has a size of H'×W'×T. Here, Z and Z' are intermediate tensors in the convolutional flow 700. Z has a size of H×W×$R_3$. Z' has a size of H'×W'×$R_4$. Through the intermediate tensors Z and Z', the input tensor X is mapped to the output tensor Y based on the core tensor 610.

As shown in FIG. 7, the convolutional operation 701 converts the input 140 into a reduced input 710 in the immediate tensor Z by using a 1×1 convolution shown below:

$$Z_{h,w,r_3} = \sum_{s=1}^{S} U^{(3)}_{(s,r_3)} X_{h,w,s}$$

where G is the core tensor 610 of size $R_1 \times R_2 \times R_3 \times R_4$, and $U^{(3)}$ is a factor matrix of size $S \times R_3$. Next, the convolutional operation 702 converts the core tensor 610 in the immediate tensor Z into another core tensor 720 in the immediate tensor Z' by using a D×D convolution shown below:

$$Z'_{h',w',r_4} = \sum_{i=1}^{D} \sum_{j=1}^{D} \sum_{r_3=1}^{R_3} G_{i,j,r_3,r_4} Z_{h_i,w_j,r_3}$$

The core tensor 720, when applied to the reduced input 710 generates a reduced output 730 in the immediate tensor Z'. Further, the convolutional operation 703 converts the reduced output 730 in the immediate tensor Z' into the output 160 in the output tensor Y by using another 1×1 convolution shown below:

$$Y_{h',w',t} = \sum_{r_4=1}^{R_4} U^{(4)}_{(t,r_4)} Z'_{h',w',r_4}$$

where $U^{(4)}$ is a factor matrix of size $T \times R_4$. As the input 140 and output 160 are not changed, the convolutional flow 700 can be integrated into the CNN 100 to replace the corresponding convolutional layer 110 and be compatible with the precedent and subsequent layers in the CNN 100.

Example Compressed CNN

Figure 8:
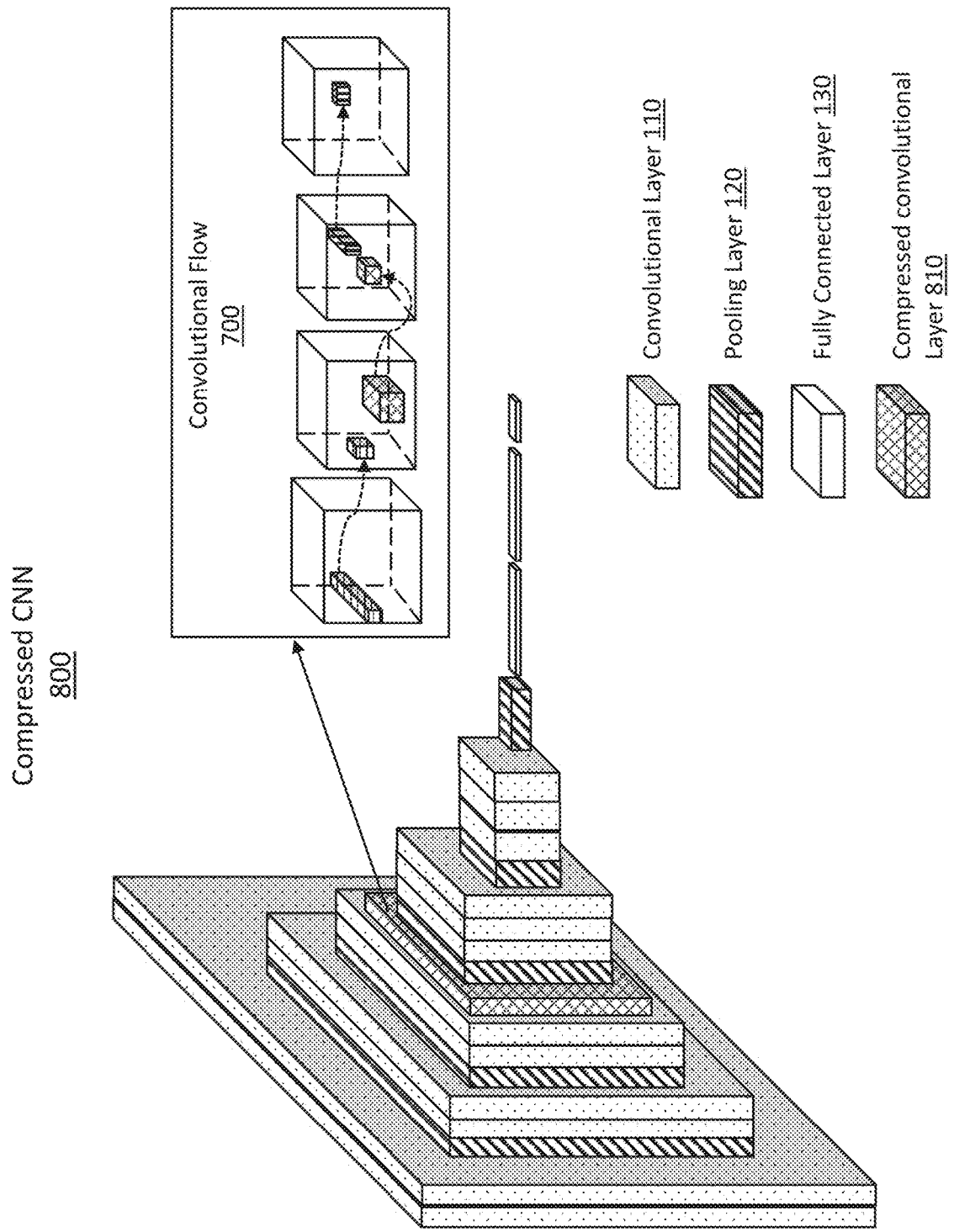
FIG. 8 illustrates an example compressed CNN, in accordance with various embodiments.

FIG. 8 illustrates an example compressed CNN 800, in accordance with various embodiments. The compressed CNN 800 includes a sequence of layers comprising a plurality of convolutional layers 110, pooling layers 120, fully connected layers 130, and a compressed convolutional layer 810. The compressed convolutional layer 810 includes the convolutional flow 700 in FIG. 7. In the embodiment of FIG. 8, the compressed convolutional layer 810 is converted from a convolutional layer 110 of the CNN 100, e.g., by the compression module 400. The convolutional layers 110, pooling layers 120, fully connected layers 130 of the compressed CNN 800 remain the same as those in the CNN 100. In other embodiments, multiple convolutional layers 110 can be converted into compressed convolutional layers 810. In some embodiments, all the convolutional layers 110 in the CNN 100 are converted into compressed convolutional layers 810. The size of the compressed CNN is smaller as more convolutional layers 110 are compressed and converted into compressed convolutional layers 810.

Example Methods of Compressing CNN

Figure 9:
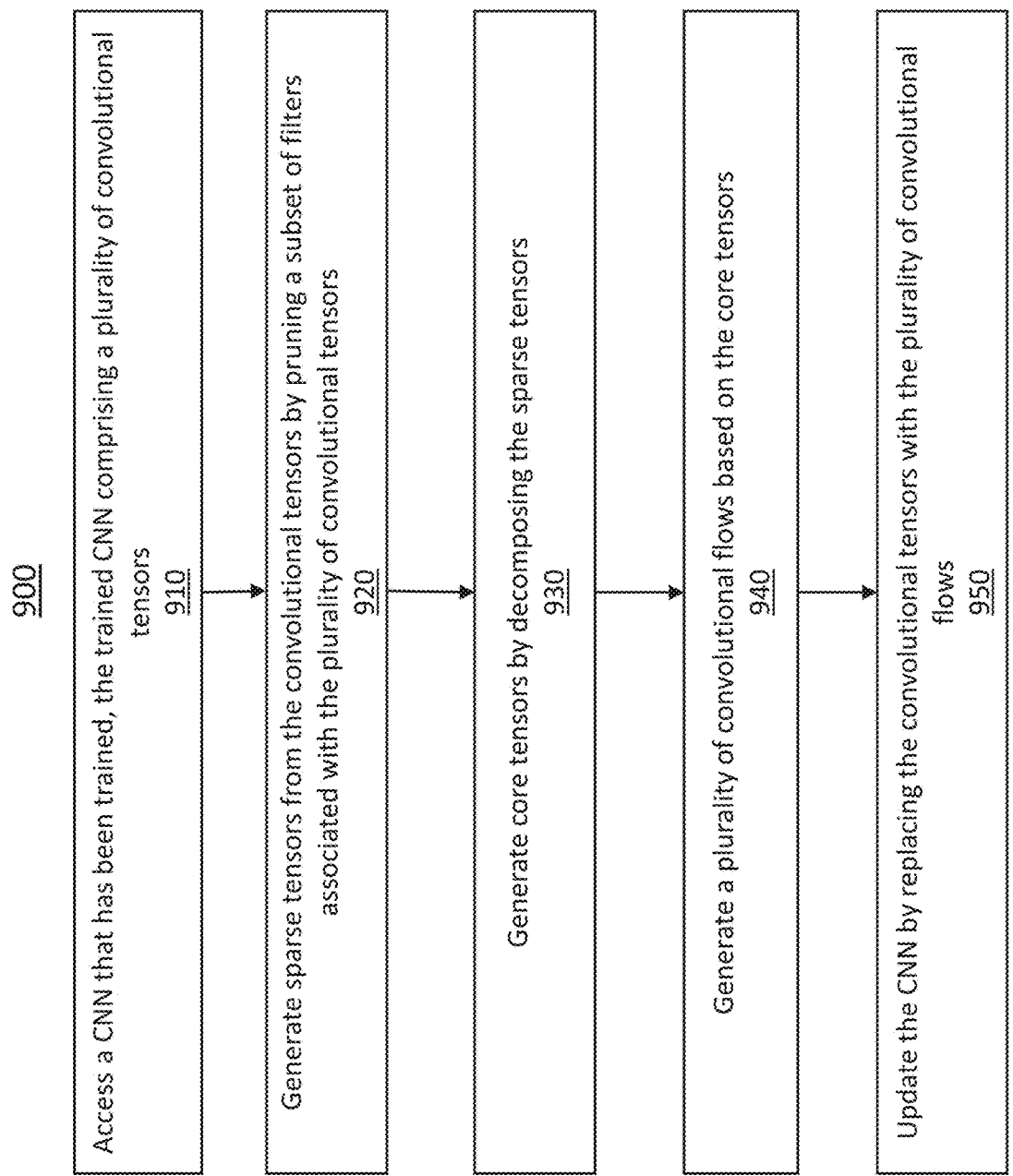
FIG. 9 is a flowchart showing a method of compressing a CNN, in accordance with various embodiments.

FIG. 9 is a flowchart showing a method 900 of compressing a CNN, in accordance with various embodiments. The method 900 may be performed by the compression module 330 described above in conjunction with FIGS. 3 and 5. Although the method 900 is described with reference to the flowchart illustrated in FIG. 9, many other methods of compressing a CNN may alternatively be used. For example, the order of execution of the steps in FIG. 9 may be changed. As another example, some of the steps may be changed, eliminated, or combined.

The compression module 330 accesses the CNN. The CNN has been trained, e.g., by the CNN system 250 in FIGS. 2 and 3 using a training dataset for a predetermined number of epochs. The CNN includes a plurality of convolutional tensors. An example of the CNN is the CNN 100 shown in FIG. 1.

The compression module 330 generates sparse tensors from the convolutional tensors by pruning a subset of filters associated with the convolutional tensors. In some embodiments, the compression module 330 prunes the filters of a convolutional tensor by using filter magnitude pruning. The compression module 330 may remove a predetermined percentage of the filters of the convolutional tensor. The predetermine percentage is, for example, in a range from 10% to 25%.

The compression module 330 generates core tensors by decomposing the sparse tensors. In some embodiments, the compression module 330 applies a tensor decomposition algorithm on a sparse tensor to generate a low-rank approximation of the sparse tensor. An example of the tensor decomposition algorithm is the Tucker decomposition algorithm. The low-rank approximation of the sparse tensor includes a core tensor and three principal tensors. The core tensor has a lower dimension than the sparse tensor. Also, compared with the convolutional tensor, the core tensor has a lower dimension and less filters. In an embodiment, the core tensor may be a 4-dimensional tensor. A principal tensor may be a 2-dimensional matrix.

The compression module 330 generates convolutional flows based on the core tensors. A convolutional flow includes the corresponding core tensor and a plurality of (e.g., 3) convolutional operations. The compression module 330 generates the convolutional operations based on the principal tensors. An example of the convolutional flow is the convolutional flow 700 described above in conjunction with FIG. 7. The convolutional operations enable the core tensor to be integrated into the CNN. In some embodiments, the convolutional operations include a 1×1 convolution, followed by a D×D convolution, further followed by another 1×1 convolution.

The compression module 330 updates the CNN by replacing the convolutional tensors with the convolutional flows. For example, a convolutional tensor in the CNN is replaced with the corresponding convolutional flow. As the core tensors have lower dimensions and less filters than the convolutional tensors, the implement of the updated CNN requires less computing resource than the implement of the CNN.

Figure 10:
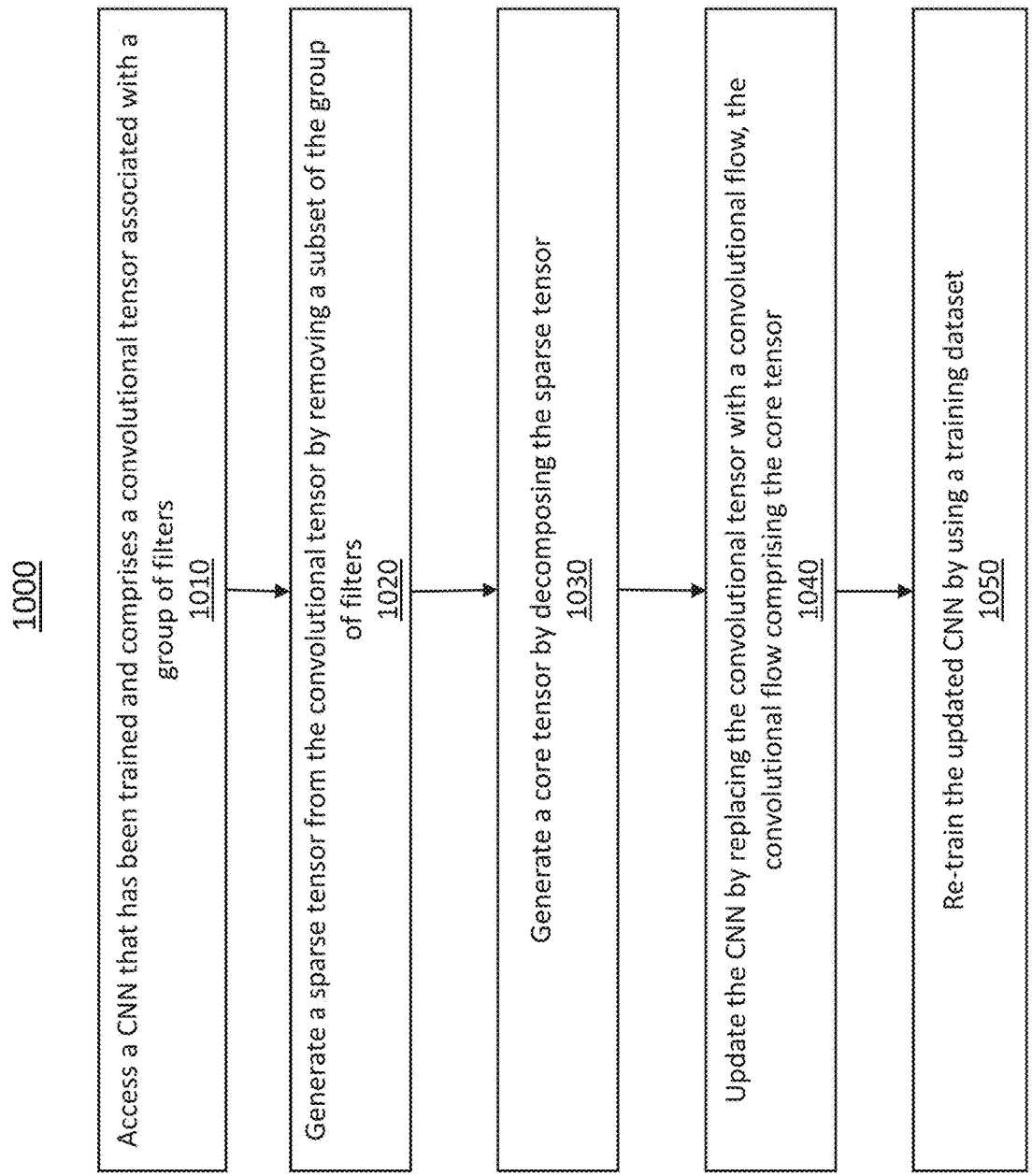
FIG. 10 is a flowchart showing another method of compressing a CNN, in accordance with various embodiments.

FIG. 10 is a flowchart showing another method 1000 of compressing a CNN, in accordance with various embodiments. The method 1000 may be performed by the compression module 330 described above in conjunction with FIGS. 3 and 4. Although the method 1000 is described with reference to the flowchart illustrated in FIG. 10, many other methods of compressing a CNN may alternatively be used. For example, the order of execution of the steps in FIG. 10 may be changed. As another example, some of the steps may be changed, eliminated, or combined.

The compression module 330 accesses the CNN. The CNN has been trained, e.g., by the CNN system 250 using a training dataset for a predetermined number of epochs. The CNN includes a plurality of convolutional tensors. An example of the CNN is the CNN 100 shown in FIG. 1.

The compression module 330 generates a sparse tensor from the convolutional tensor by pruning a subset of the group of filters. In some embodiments, the compression module 330 prunes the filters of the convolutional tensor by using filter magnitude pruning. The compression module 330 may remove a predetermined percentage of the filters of the convolutional tensor. The predetermine percentage is, for example, in a range from 10% to 25%.

The compression module 330 generates a core tensor by decomposing the sparse tensor. In some embodiments, the compression module 330 applies a tensor decomposition algorithm on a sparse tensor to generate a low-rank approximation of the sparse tensor. An example of the tensor decomposition algorithm is Tucker-2 decomposition algorithm. The low-rank approximation of the sparse tensor includes a core tensor and three principal tensors. The core tensor has a lower dimension than the sparse tensor. In an embodiment, the core tensor may be a 4-rank tensor. A principal tensor may be a 2-dimensional matrix.

The compression module 330 updates the CNN by replacing the convolutional tensor with a convolutional flow. The convolutional flow includes the core tensor. The convolutional flow may also include a plurality of (e.g., 3) convolutional operations. The compression module 330 generates the convolutional operations based on the principal tensors. An example of the convolutional flow is the convolutional flow 700 described above in conjunction with FIG. 6. The convolutional operations enable the core tensor to be integrated into the CNN. In some embodiments, the convolutional operations include two 1×1 convolutions and a D×D convolution. As the core tensors have lower dimensions and less filters than the convolutional tensors, the CNN is compressed. The implement of the updated CNN requires less computing resource than the implement of the CNN.

The compression module 330 re-trains the updated CNN by using a training dataset. In some embodiments, the compression module 330 fine-tunes the updated CNN through the re-training process. For instance, the compression module 330 uses a training dataset, which may be the same training dataset used to train the CNN, to train the updated CNN for a predetermined number of epochs, which may be a lower number than the number of epochs used for training the CNN. As the CNN has been pre-trained, the process of training the updated CNN is a re-training process.

Example Computing Device

Figure 11:
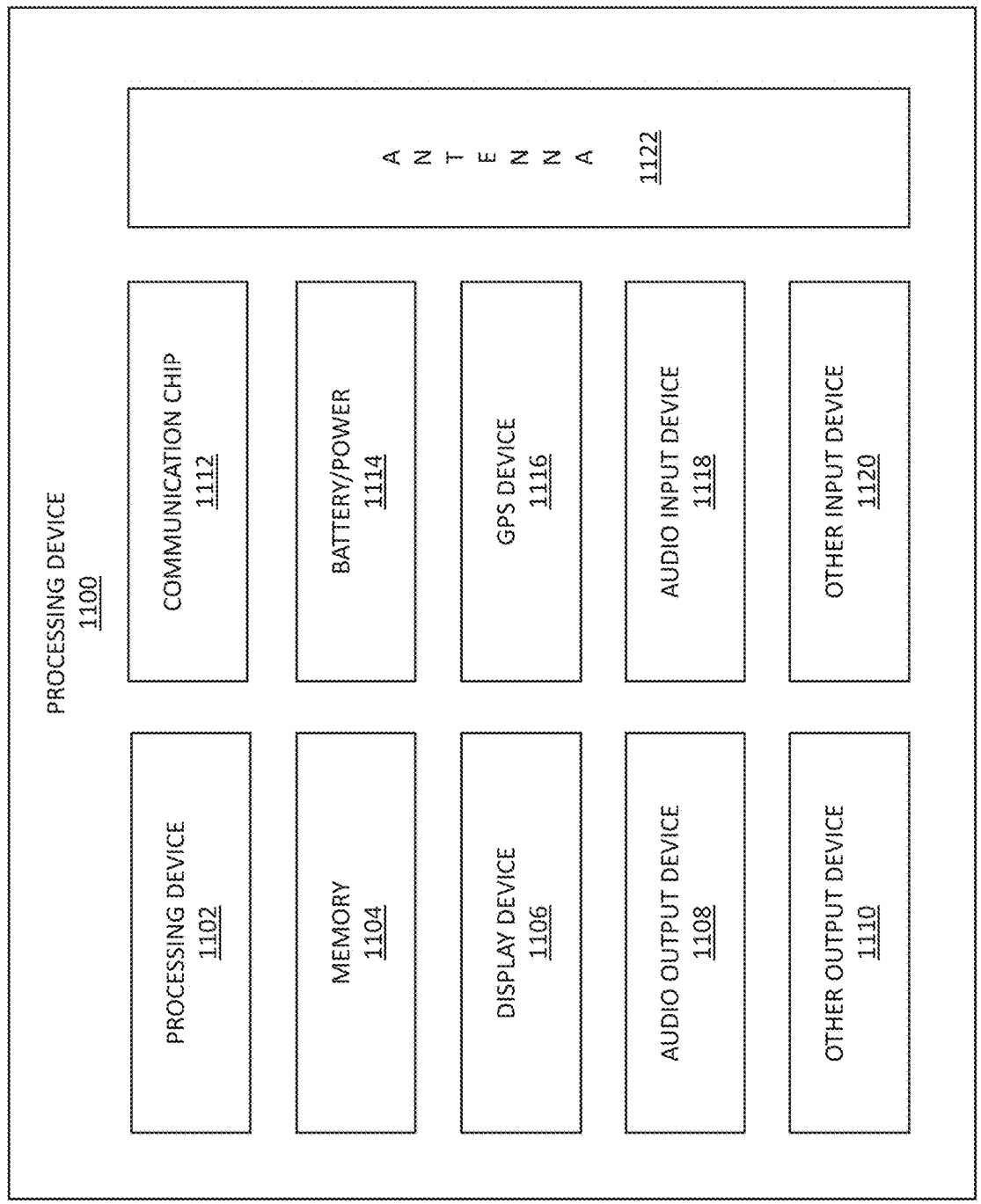
FIG. 11 is a block diagram of an example computing device, in accordance with various embodiments.

FIG. 11 is a block diagram of an example computing system for use as the CNN system 250, in accordance with various embodiments. A number of components are illustrated in FIG. 11 as included in the computing system 1100, but any one or more of these components may be omitted or duplicated, as suitable for the application. In some embodiments, some or all of the components included in the computing system 1100 may be attached to one or more motherboards. In some embodiments, some or all of these components are fabricated onto a single system on a chip (SoC) die. Additionally, in various embodiments, the computing system 1100 may not include one or more of the components illustrated in FIG. 11, but the computing system 1100 may include interface circuitry for coupling to the one or more components. For example, the computing system 1100 may not include a display device 1106, but may include display device interface circuitry (e.g., a connector and driver circuitry) to which a display device 1106 may be coupled. In another set of examples, the computing system 1100 may not include an audio input device 1118 or an audio output device 1108, but may include audio input or output device interface circuitry (e.g., connectors and supporting circuitry) to which an audio input device 1118 or audio output device 1108 may be coupled.

The computing system 1100 may include a processing device 1102 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1102 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing system 1100 may include a memory 1104, which may itself include one or more memory devices such as volatile memory (e.g., DRAM), nonvolatile memory (e.g., read-only memory (ROM)), flash memory, solid state memory, and/or a hard drive. In some embodiments, the memory 1104 may include memory that shares a die with the processing device 1102. In some embodiments, the memory 1104 includes one or more non-transitory computer-readable media storing instructions executable to perform operations for compressing a CNN, e.g., the methods 900 and 1000 described above in conjunction with FIGS. 9 and 10 or the operations performed by the compression module 330 described above in conjunction with FIGS. 3 and 4. The instructions stored in the one or more non-transitory computer-readable media may be executed by the processing device 1102.

In some embodiments, the computing system 1100 may include a communication chip 1112 (e.g., one or more communication chips). For example, the communication chip 1112 may be configured for managing wireless communications for the transfer of data to and from the computing system 1100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1112 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1112 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1112 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1112 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1112 may operate in accordance with other wireless protocols in other embodiments. The computing system 1100 may include an antenna 1122 to facilitate wireless communications and/or to receive other wireless communications (such as AM or FM radio transmissions).

In some embodiments, the communication chip 1112 may manage wired communications, such as electrical, optical, or any other suitable communication protocols (e.g., the Ethernet). As noted above, the communication chip 1112 may include multiple communication chips. For instance, a first communication chip 1112 may be dedicated to shorter-range wireless communications such as Wi-Fi or Bluetooth, and a second communication chip 1112 may be dedicated to longer-range wireless communications such as global positioning system (GPS), EDGE, GPRS, CDMA, WiMAX, LTE, EV-DO, or others. In some embodiments, a first communication chip 1112 may be dedicated to wireless communications, and a second communication chip 1112 may be dedicated to wired communications.

The computing system 1100 may include battery/power circuitry 1114. The battery/power circuitry 1114 may include one or more energy storage devices (e.g., batteries or capacitors) and/or circuitry for coupling components of the computing system 1100 to an energy source separate from the computing system 1100 (e.g., AC line power).

The computing system 1100 may include a display device 1106 (or corresponding interface circuitry, as discussed above). The display device 1106 may include any visual indicators, such as a heads-up display, a computer monitor, a projector, a touchscreen display, a liquid crystal display (LCD), a light-emitting diode display, or a flat panel display, for example.

The computing system 1100 may include an audio output device 1108 (or corresponding interface circuitry, as discussed above). The audio output device 1108 may include any device that generates an audible indicator, such as speakers, headsets, or earbuds, for example.

The computing system 1100 may include an audio input device 1118 (or corresponding interface circuitry, as discussed above). The audio input device 1118 may include any device that generates a signal representative of a sound, such as microphones, microphone arrays, or digital instruments (e.g., instruments having a musical instrument digital interface (MIDI) output).

The computing system 1100 may include a GPS device 1116 (or corresponding interface circuitry, as discussed above). The GPS device 1116 may be in communication with a satellite-based system and may receive a location of the computing system 1100, as known in the art.

The computing system 1100 may include an other output device 1111 (or corresponding interface circuitry, as discussed above). Examples of the other output device 1111 may include an audio codec, a video codec, a printer, a wired or wireless transmitter for providing information to other devices, or an additional storage device.

The computing system 1100 may include an other input device 1120 (or corresponding interface circuitry, as discussed above). Examples of the other input device 1120 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing system 1100 may have any desired form factor, such as a handheld or mobile computing system (e.g., a cell phone, a smart phone, a mobile internet device, a music player, a tablet computer, a laptop computer, a netbook computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing system 1100 may be any other electronic device that processes data.

Select Examples

The following paragraphs provide various examples of the embodiments disclosed herein.

Example 1 provides for a method for compressing a convolutional neural network (CNN), the method including accessing the CNN that has been trained, the trained CNN including a plurality of convolutional tensors; generating sparse tensors from the convolutional tensors by pruning a subset of filters associated with the plurality of convolutional tensors; generating core tensors by decomposing the sparse tensors; generating a plurality of convolutional flows based on the core tensors, a convolutional flow including a core tensor and a plurality of convolutional operations associated with the core tensor; and updating the CNN by replacing the convolutional tensors with the plurality of convolutional flows.

Example 2 provides for the method according to example 1, where generating the core tensors by decomposing the sparse tensors includes generating the core tensors and principal tensors by decomposing the sparse tensors.

Example 3 provides for the method according to example 2, where generating the convolutional flow includes generating the plurality of convolutional operations by using some of the principal tensors.

Example 4 provides for the method according to example 3, where the plurality of convolutional operations include two 1×1 convolutions and a D×D convolution, and D is an integral number that is larger than 1.

Example 5 provides for the method according to example 2, where the principal tensors are two-dimensional matrices.

Example 6 provides for the method according to example 1, where pruning the subset of the filters associated with the convolutional tensors includes for a convolutional tensor, generating a sparse tensor by pruning a subset of filters associated with the convolutional tensor.

Example 7 provides for the method according to example 1, where a ratio of a number of the filters in the subset to a number of the filters associated with the convolutional tensors is in a range from 10% to 25%.

Example 8 provides for the method according to example 1, where the sparse tensors have four dimensions and generating the core tensors by decomposing the sparse tensors includes decomposing the sparse tensors in two of the four dimensions.

Example 9 provides for the method according to example 1, further including re-training the updated CNN by using a training dataset for a first number of times a deep learning algorithm will work through the training dataset.

Example 10 provides for the method according to example 9, where the CNN has been trained by using the training dataset for a second number of times the deep learning algorithm will work through the training dataset, and the second number is higher than the first number.

Example 11 provides for one or more non-transitory computer-readable media storing instructions executable to perform operations for compressing a convolutional neural network (CNN), the operations including accessing the CNN that has been trained, the trained CNN including a plurality of convolutional tensors; generating sparse tensors from the convolutional tensors by pruning a subset of filters associated with the plurality of convolutional tensors; generating core tensors by decomposing the sparse tensors; generating a plurality of convolutional flows based on the core tensors, a convolutional flow including a core tensor and a plurality of convolutional operations associated with the core tensor; and updating the CNN by replacing the convolutional tensors with the plurality of convolutional flows.

Example 12 provides for the one or more non-transitory computer-readable media according to example 11, where generating the core tensors by decomposing the sparse tensors includes generating the core tensors and principal tensors by decomposing the sparse tensors.

Example 13 provides for the one or more non-transitory computer-readable media according to example 12, where generating the convolutional flow includes generating the plurality of convolutional operations by using some of the principal tensors.

Example 14 provides for the one or more non-transitory computer-readable media according to example 13, where the plurality of convolutional operations includes two 1×1 convolutions and a D×D convolution, and D is an integral number that is larger than 1.

Example 15 provides for the one or more non-transitory computer-readable media according to example 12, where the principal tensors are two-dimensional matrices.

Example 16 provides for the one or more non-transitory computer-readable media according to example 11, where pruning the subset of the filters associated with the convolutional tensors includes for a convolutional tensor, generating a sparse tensor by pruning a subset of filters associated with the convolutional tensor.

Example 17 provides for the one or more non-transitory computer-readable media according to example 11, where a ratio of a number of the filters in the subset to a number of the filters associated with the convolutional tensors is in a range from 10% to 25%.

Example 18 provides for the one or more non-transitory computer-readable media according to example 11, where the sparse tensors have four dimensions and generating the core tensors by decomposing the sparse tensors includes decomposing the sparse tensors in two of the four dimensions.

Example 19 provides for the one or more non-transitory computer-readable media according to example 11, further including re-training the updated CNN by using a training dataset for a first number of times a deep learning algorithm will work through the training dataset.

Example 20 provides for the one or more non-transitory computer-readable media according to example 19, where the CNN has been trained by using the training dataset for a second number of times the deep learning algorithm will work through the training dataset, and the second number is higher than the first number.

Example 21 provides for an apparatus for compressing a convolutional neural network (CNN), the apparatus including a computer processor for executing computer program instructions; and a non-transitory computer-readable memory storing computer program instructions executable by the computer processor to perform operations including accessing the CNN that has been trained, the trained CNN including a plurality of convolutional tensors; generating sparse tensors from the convolutional tensors by pruning a subset of filters associated with the plurality of convolutional tensors; generating core tensors by decomposing the sparse tensors; generating a plurality of convolutional flows based on the core tensors, a convolutional flow including a core tensor and a plurality of convolutional operations associated with the core tensor; and updating the CNN by replacing the convolutional tensors with the convolutional flows.

Example 22 provides for the apparatus according to example 21, where generating the core tensors by decomposing the sparse tensors includes generating the core tensors and principal tensors by decomposing the sparse tensors.

Example 23 provides for the apparatus according to example 21, where a ratio of a number of the filters in the subset to a number of the filters associated with the convolutional tensors is in a range from 10% to 25%.

Example 24 provides for the apparatus according to example 21, where the sparse tensors have four dimensions and generating the core tensors by decomposing the sparse tensors includes decomposing the sparse tensors in two of the four dimensions.

Example 25 provides for the apparatus according to example 21, further including re-training the updated CNN by using a training dataset for a first number of times a deep learning algorithm will work through the training dataset, where the CNN has been trained by using the training dataset for a second number of times the deep learning algorithm will work through the training dataset, and the second number is higher than the first number.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method for compressing a convolutional neural network (CNN), the method comprising:
   accessing the CNN that has been trained, the trained CNN comprising a plurality of convolutional tensors;
   generating sparse tensors from the convolutional tensors by pruning a subset of filters associated with the plurality of convolutional tensors;
   generating core tensors by decomposing the sparse tensors;
   generating a plurality of convolutional flows based on the core tensors, a convolutional flow comprising a core tensor and a plurality of convolutional operations associated with the core tensor; and
   updating the CNN by replacing the convolutional tensors with the plurality of convolutional flows,
   wherein a ratio of a number of the filters in the subset to a number of the filters associated with the convolutional tensors is in a range from 10% to 25%.

2. The method according to claim 1, wherein generating the core tensors by decomposing the sparse tensors comprises:
   generating the core tensors and principal tensors by decomposing the sparse tensors.

3. The method according to claim 2, wherein generating the convolutional flow comprises:
generating the plurality of convolutional operations by using some of the principal tensors.

4. The method according to claim 3, wherein the plurality of convolutional operations include two 1×1 convolutions and a D×D convolution, and D is an integral number that is larger than 1.

5. The method according to claim 2, wherein the principal tensors are two-dimensional matrices.

6. The method according to claim 1, wherein pruning the subset of the filters associated with the convolutional tensors comprises:
for a convolutional tensor, generating a sparse tensor by pruning a subset of filters associated with the convolutional tensor.

7. The method according to claim 1, wherein the sparse tensors have four dimensions and generating the core tensors by decomposing the sparse tensors comprises:
decomposing the sparse tensors in two of the four dimensions.

8. The method according to claim 1, further comprising:
re-training the updated CNN by using a training dataset for a first number of times a deep learning algorithm will work through the training dataset.

9. The method according to claim 8, wherein the CNN has been trained by using the training dataset for a second number of times the deep learning algorithm will work through the training dataset, and the second number is higher than the first number.

10. One or more non-transitory computer-readable media storing instructions executable to perform operations for compressing a convolutional neural network (CNN), the operations comprising:
accessing the CNN that has been trained, the trained CNN comprising a plurality of convolutional tensors;
generating sparse tensors from the convolutional tensors by pruning a subset of filters associated with the plurality of convolutional tensors;
generating core tensors by decomposing the sparse tensors;
generating a plurality of convolutional flows based on the core tensors, a convolutional flow comprising a core tensor and a plurality of convolutional operations associated with the core tensor; and
updating the CNN by replacing the convolutional tensors with the plurality of convolutional flows,
wherein a ratio of a number of the filters in the subset to a number of the filters associated with the convolutional tensors is in a range from 10% to 25%.

11. The one or more non-transitory computer-readable media according to claim 10, wherein generating the core tensors by decomposing the sparse tensors comprises:
generating the core tensors and principal tensors by decomposing the sparse tensors.

12. The one or more non-transitory computer-readable media according to claim 11, wherein generating the convolutional flow comprises:
generating the plurality of convolutional operations by using some of the principal tensors.

13. The one or more non-transitory computer-readable media according to claim 12, wherein the plurality of convolutional operations includes two 1×1 convolutions and a D×D convolution, and D is an integral number that is larger than 1.

14. The one or more non-transitory computer-readable media according to claim 11, wherein the principal tensors are two-dimensional matrices.

15. The one or more non-transitory computer-readable media according to claim 10, wherein pruning the subset of the filters associated with the convolutional tensors comprises:
for a convolutional tensor, generating a sparse tensor by pruning a subset of filters associated with the convolutional tensor.

16. The one or more non-transitory computer-readable media according to claim 10, wherein the sparse tensors have four dimensions and generating the core tensors by decomposing the sparse tensors comprises:
decomposing the sparse tensors in two of the four dimensions.

17. The one or more non-transitory computer-readable media according to claim 10, wherein the operations further comprise:
re-training the updated CNN by using a training dataset for a first number of times a deep learning algorithm will work through the training dataset.

18. The one or more non-transitory computer-readable media according to claim 17, wherein the CNN has been trained by using the training dataset for a second number of times the deep learning algorithm will work through the training dataset, and the second number is higher than the first number.

19. An apparatus for compressing a convolutional neural network (CNN), the apparatus comprising:
a computer processor for executing computer program instructions; and
a non-transitory computer-readable memory storing computer program instructions executable by the computer processor to perform operations comprising:
accessing the CNN that has been trained, the trained CNN comprising a plurality of convolutional tensors,
generating sparse tensors from the convolutional tensors by pruning a subset of filters associated with the plurality of convolutional tensors,
generating core tensors by decomposing the sparse tensors,
generating a plurality of convolutional flows based on the core tensors, a convolutional flow comprising a core tensor and a plurality of convolutional operations associated with the core tensor, and
updating the CNN by replacing the convolutional tensors with the plurality of convolutional flows,
wherein a ratio of a number of the filters in the subset to a number of the filters associated with the convolutional tensors is in a range from 10% to 25%.

20. The apparatus according to claim 19, wherein generating the core tensors by decomposing the sparse tensors comprises:
generating the core tensors and principal tensors by decomposing the sparse tensors.

21. The apparatus according to claim 19, wherein the sparse tensors have four dimensions and generating the core tensors by decomposing the sparse tensors comprises:
decomposing the sparse tensors in two of the four dimensions.

22. The apparatus according to claim 19, wherein the operations further comprise:
re-training the updated CNN by using a training dataset for a first number of times a deep learning algorithm will work through the training dataset, wherein the CNN has been trained by using the training dataset for a second number of times the deep learning algorithm will work through the training dataset, and the second number is higher than the first number.

23. The apparatus according to claim 20, wherein generating the convolutional flow comprises:
generating the plurality of convolutional operations by using some of the principal tensors.

24. The apparatus according to claim 23, wherein the plurality of convolutional operations include two 1×1 convolutions and a D×D convolution, and D is an integral number that is larger than 1.

25. The apparatus according to claim 19, wherein pruning the subset of the filters associated with the convolutional tensors comprises:
for a convolutional tensor, generating a sparse tensor by pruning a subset of filters associated with the convolutional tensor.

* * * * *